Oct. 26, 1926.

I. HECHENBLEIKNER

PRECIPITATING APPARATUS

Filed Feb. 7, 1923    2 Sheets-Sheet 1

1,604,553

Inventor
Ingenuin Hechenbleikner
By Meyers, Cavanagh
 & Whitehead
Attorneys

Patented Oct. 26, 1926.

1,604,553

UNITED STATES PATENT OFFICE.

INGENUIN HECHENBLEIKNER, OF CHARLOTTE, NORTH CAROLINA.

PRECIPITATING APPARATUS.

Application filed February 7, 1923. Serial No. 617,550.

My invention relates to precipitating apparatus, and more especially to apparatus or appliances for precipitating liquids, such as acids, including sludge acids.

An important object of the invention is to provide a substantially unitary apparatus for precipitating from the concentrated gases of acids or other liquids, vapor or liquid particles of the acids carried therein, for return to the concentrator for further treatment.

The characteristics and advantages of the invention are further sufficiently explained in connection with the following detailed description of the accompanying drawings, which show one exemplifying embodiment of the invention. After considering this, persons skilled in the art will understand that many variations may be made within the principles of the invention, and I contemplate the employment of any structures which are properly within the scope of the appended claims.

Figure 1:
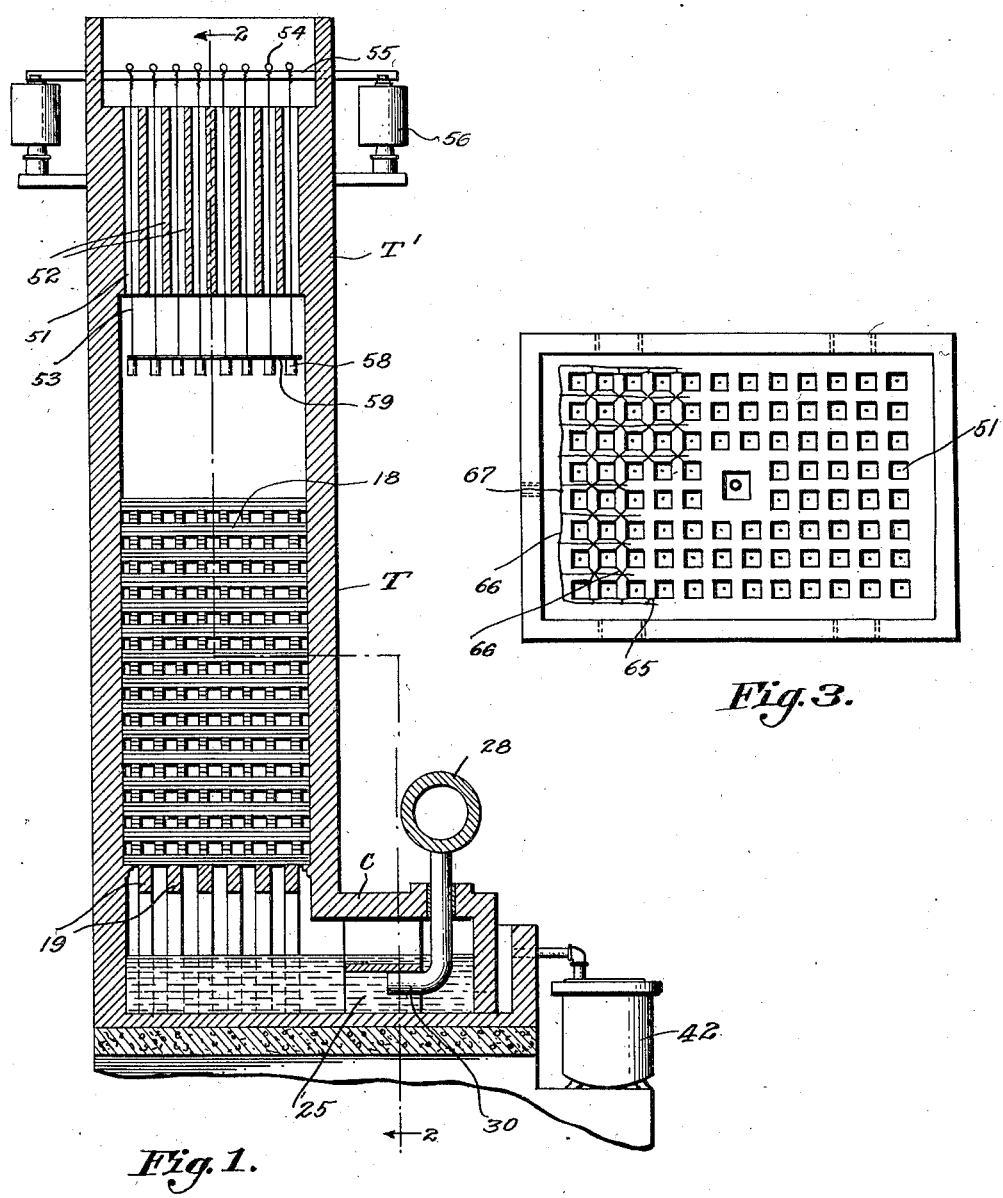
Figure 1 is a vertical longitudinal section of apparatus embodying the invention in one form.
Figure 3:
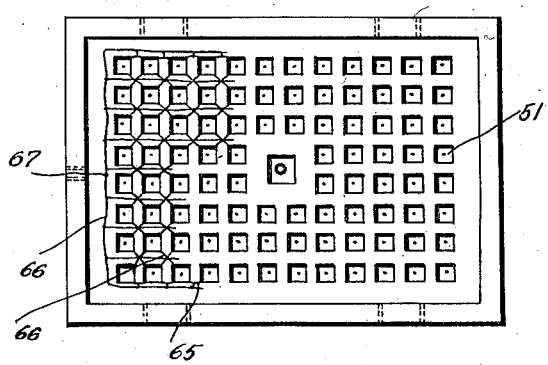
Figure 3 is a top plan of the tower with certain of the electrode supports or conductors removed.
Figure 4:
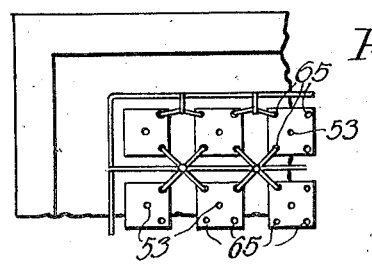
Figure 4 is an enlarged detail in plan of the top of the flues showing the arrangement of the collecting electrodes.
Figure 2:
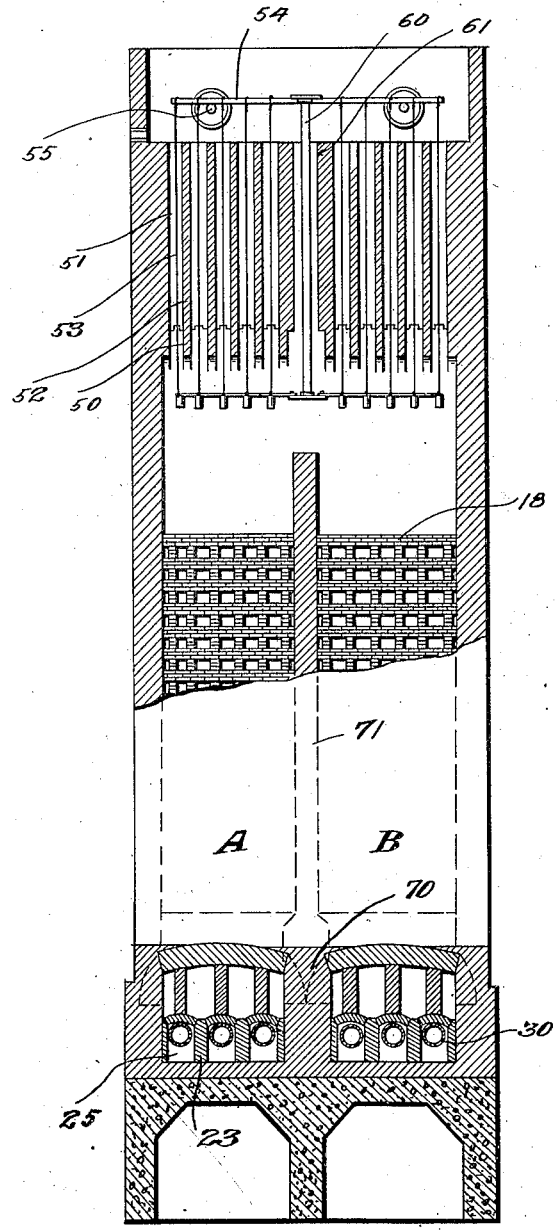
Figure 2 is a composite vertical section in the plane 2—2, Fig. 1.

The lower part of the apparatus as shown in Figures 1 and 2 is a concentrating apparatus which may be of any preferred construction, including a concentrating chamber C and a preheating tower T provided with brick checkerwork 18 resting on arches 19. The dilute or unconcentrated acid may be introduced into the stack or tower above the checkerwork and is heated as it flows down through the checkerwork in counter-current relation to the hot gases ascending therethrough. The concentrating chamber is provided with horizontal flues 25 separated by walls 23. Hot gases supplied through a manifold 28 are blown through pipes 30 in flues 25 to heat and concentrate the acid.

The hot gases ascending through the checkerwork entrain or carry along with them a certain percentage of acid in the form of vapor or liquid particles. It has been heretofore proposed to precipitate such liquid particles by electrical treatment in separate apparatus requiring the diversion of hot gases to such apparatus which constitutes substantially an independent mechanism or installation. My invention provides for the combination with or incorporation in the concentrating apparatus itself of electrical precipitating means or apparatus by means of which the gases are freed of liquid or acid vapor or particles by electrical precipitation and discharged in an entirely or substantially acid-free condition, the precipitated liquid or acid being returned directly to the concentrator for further treatment therein.

To this end in the present embodiment of the invention the above described or other suitable concentrating apparatus having a tower T is provided with an extension T' of the tower which consists simply in vertical extensions of the walls of the tower T. The electrical precipitating means is located in the upper part of the tower extension T'. For this purpose a plurality of spaced aches 50 of acid resisting brick or other suitable material, are arranged to intersect the tower extension T' at a suitable level. A system of flues 51 of acid-proof brick or other suitable non-metallic material, is built upon the arches by constructing intersecting partition walls 52 at properly spaced intervals, the flues so produced being most conveniently of square cross section. A discharge or precipitating electrode in the form of a lead wire 53 extends centrally through each of the flues. At their upper ends these electrodes are connected to any suitable conducting supports such as lead covered pipes 54 and these pipes are in turn carried by one or more transversely arranged supporting conductors 55 in the form of lead covered pipe, the ends of which extend out through the walls of the tower and are connected to any suitable source of high tension or high frequency current (not shown). The main conductors or supports 55 may be insulated in any suitable way, for instance, by high capacity insulators 56, and ample clearance may be provided around the conductors where they pass through the tower walls.

The conductors 53 are conveniently tensioned and caused to hang straight and centrally in the flues by lead weights 58 secured to their lower ends and properly spaced by gridwork 59, and the gridwork may be supported against lateral movement in any convenient way. Specifically in the present case the center of the gridwork is connected to a rigid pipe electrode 60 which passes up through a central flue 61 and is secured at its upper end to the upper supporting conductors such as certain of the pipes 54.

While after the flue surfaces have become moistened, these moistened surfaces will act to a certain extent as collecting electrodes of opposite polarity to the wire discharge electrodes 53, it is preferable to provide in each flue at least one collecting electrode in the form of a lead wire 65, and most desirably four of these wire electrodes are arranged in each flue, one in each corner, for reasons hereafter explained. The adjacent collecting electrodes 65 of adjacent flues are interconnected by any suitable cross connections 66 and suitable leads or conductors 67 are run off from the cross connections and grounded or connected to the other side of the circuit which supplies central electrodes 53. The collecting electrodes and their connections are omitted in Figures 1 and 2 to avoid complicating the drawings by plurality of single lines.

The described arrangement of the collecting electrodes at the four corners of the rectangular flues serves to equalize the precipitating effect since, as above stated, the wet brick or masonry flue surfaces act to a considerable extent as collectors, and the lead electrodes of higher conductivity or electrical capacity at points furthest removed from the central electrodes, tend to increase the precipitating effect at these remote points and so to substantially equalize the precipitating effect of the entire flue surface.

The hot gases rising through the checkerwork 18 pass up through the plurality of flues 51 which divide the gases into areas of small cross section, and the high tension effect produced between the central electrodes and the collecting electrodes or the entire flue surfaces, as above described, causes a very complete precipitation of the acid or liquid particles upon the flue walls, and this liquid runs down and drops upon the checkerwork and so returns directly to the concentrator for further concentration therein.

In the particular embodiment of the invention here shown the concentrator consists substantially of two units A and B as best shown in Fig. 2, being separated by a partition wall 70 having an extension 71 extending up in the tower to a point above the checkerwork. Evidently, however, where smaller capacity is desired or where for any reason this multiple arrangement is not necessary or desirable, a single concentrator of the type shown with a simple tower, undivided except for a single stack of checkerwork, may be provided, and the precipitating apparatus will in that case be arranged accordingly, or substantially within the limits of the tower section A or B of Fig. 2.

I claim:

1. An electrical precipitating apparatus of the class described, comprising a stack, a system of parallel vertical flues of non-conducting material therein, each polygonal in cross section an electrode wire arranged centrally in each flue, conducting supports for the upper ends of said wires, a weight at the lower end of each wire and means independent of the weights for spacing and preventing lateral movement of the lower ends of the wires.

2. An electrical precipitating apparatus of the class described, comprising a stack, a system of parallel vertical flues of non-conducting material therein, each polygonal in cross section an electrode wire arranged centrally in each flue, conducting supports for the upper ends of said wires, a weight at the lower ends of each wire, and a gridwork independent of the weights holding the lower ends of the wires in properly spaced relation.

3. Precipitating apparatus of the class described, comprising a tower having checkerwork therein providing a plurality of parallel flues polygonal in cross section and of substantially non-conducting material, a central electrode wire passing through each flue, a collecting electrode extending longitudinally through each flue at each angle thereof, and conductors of opposite polarity connecting the central and the collecting electrodes.

4. Precipitating apparatus of the class described, comprising a tower, including a checkerwork of substantially non-conducting material, providing a plurality of parallel vertical flues of polygonal cross section, a central electrode wire passing through each flue, means for retaining the central electrodes in substantially fixed position, a plurality of collecting electrode wires extending longitudinally through each flue in spaced relation against the wall thereof and located substantially in the flue corners, means for tensioning each wire and conductors of opposite polarity connecting the central and collecting electrodes.

5. Precipitating apparatus of the class described, comprising a tower, including a checkerwork of substantially non-conducting material, providing a plurality of parallel vertical flues of square cross section; a central electrode passing through each flue, means for retaining the central electrodes in substantially fixed position, and a plurality of collecting electrodes extending longitudinally through each flue in spaced relation against the wall thereof and located substantially in the flue corners, and conductors of opposite polarity connecting the central and collecting electrodes.

6. In a tower having flues polygonal in cross section and of nonconducting material, a discharge electrode at the center of each flue, and collecting electrodes in the angles of the flue.

Signed at New York, in the county of New York and State of New York, this 1st day of February, A. D. 1923.

INGENUIN HECHENBLEIKNER.